(12) United States Patent
Kamvar et al.

(10) Patent No.: US 7,028,029 B2
(45) Date of Patent: Apr. 11, 2006

(54) ADAPTIVE COMPUTATION OF RANKING

(75) Inventors: Sepandar D. Kamvar, Palo Alto, CA (US); Taher H. Haveliwala, Mountain View, CA (US); Gene H. Golub, Stanford, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 10/925,189

(22) Filed: Aug. 23, 2004

(65) Prior Publication Data

US 2005/0027685 A1     Feb. 3, 2005

Related U.S. Application Data

(63) Continuation-in-part of application No. 10/646,331, filed on Aug. 22, 2003.

(60) Provisional application No. 60/458,921, filed on Mar. 28, 2003.

(51) Int. Cl.
*G06F 17/30* (2006.01)

(52) U.S. Cl. .................... 707/5; 3/7; 715/501.1

(58) Field of Classification Search ............... 707/3, 707/100, 5, 101, 10; 706/15; 715/500
See application file for complete search history.

(56) References Cited

U.S. PATENT DOCUMENTS

| | | | |
|---|---|---|---|
| 6,112,202 A | | 8/2000 | Kleinberg |
| 6,285,999 B1 * | | 9/2001 | Page ............................ 707/5 |
| 6,560,600 B1 * | | 5/2003 | Broder ........................... 707/7 |
| 6,584,468 B1 * | | 6/2003 | Gabriel et al. ................ 707/10 |
| 6,799,176 B1 * | | 9/2004 | Page ............................. 707/5 |
| 6,871,202 B1 * | | 3/2005 | Broder ........................... 707/7 |
| 2003/0204502 A1 * | | 10/2003 | Tomlin et al. ................. 707/5 |
| 2003/0208478 A1 * | | 11/2003 | Harvey .......................... 707/3 |
| 2003/0208482 A1 * | | 11/2003 | Kim et al. ..................... 707/3 |
| 2004/0024752 A1 * | | 2/2004 | Manber et al. ................ 707/3 |
| 2004/0111412 A1 * | | 6/2004 | Broder ........................... 707/7 |

OTHER PUBLICATIONS

Arasu, A., et al., "PageRank Computation and the Structure of the Web: Experiments and Algorithms," *Proceedings of the 11th Int'l World Wide Web Conf., Poster Track*, 2002.

Bharat, K., et al., "Improved Algorithms for Topic Distillation in a Hyperlinked Environment," *Proceedings of the ACM-SIGIR*, 1998.

(Continued)

*Primary Examiner*—Jean M. Corrielus
(74) *Attorney, Agent, or Firm*—Morgan, Lewis & Bockius LLP

(57) ABSTRACT

A system and method is disclosed in which a ranking function for a set of document rank values is iteratively solved with respect to a set of linked documents until a first stability condition is satisfied. After such condition is satisfied, some of the ranks will have converged. The ranking function is modified to take into account these converged ranks so as to reduce the ranking function's computation cost. The modified ranking function is then solved until a second stability condition is satisfied. After such condition is satisfied more of the ranks will have converged. The ranking function is again modified and process continues until complete.

31 Claims, 5 Drawing Sheets

OTHER PUBLICATIONS

Haveliwala, T., "Efficient Computation of PageRank," *Stanford University Technical Report*, 1999.

Haveliwala, T., "Topic Sensitive PageRank," *Proceedings of the 11th Int'l World Wide Web Conf.*, 2002.

Haveliwala, T., et al., "The Second Eigenvalue of the Google Matrix," *Stanford University Technical Report*, 2003.

Jeh, G., et al., "Scaling Personalized Web Search," *Proceedings of the 12th Int'l World Wide Web Conf.*, 2003.

Kamvar, S., et al., "Exploiting the Block Structure of the Web for Computing PageRank," *Stanford University Technical Report*, 1999.

Kamvar, S., et al., "Extrapolation Methods for Accelerating PageRank Computations," *Proceedings of the 12th Int'l World Wide Web Conf.*, 2003.

Page, L., et al., "The PageRank Citation Ranking: Bringing Order to the Web," *Stanford Digital Libraries Working Paper*, 1998.

* cited by examiner

ADAPTIVE COMPUTATION OF RANKING

RELATED APPLICATIONS

This application is a continuation-in-part of U.S. Utility patent application Ser. No. 10/646,331, filed Aug. 22, 2003, which claimed priority on U.S. Provisional Patent Application No. 60/458,921 filed Mar. 28, 2003, both of which are incorporated by reference herein in their entirety.

STATEMENT OF GOVERNMENT SPONSORED SUPPORT

This invention was supported in part by the National Science Foundation under Grant No. IIS-0085896 and Grant No. CCR-9971010. The US Government has certain rights in this invention.

TECHNICAL FIELD

The present invention relates generally to improved techniques for analyzing large directed graphs for use in computer systems, and in particular to reducing the computational complexity of assigning ranks to nodes.

BACKGROUND

A search engine is a software program designed to help a user access files stored on a computer, for example on the World Wide Web (WWW), by allowing the user to ask for documents meeting certain criteria (e.g., those containing a given word, a set of words, or a phrase) and retrieving files that match those criteria. Web search engines work by storing information about a large number of web pages (hereinafter also referred to as "pages" or "documents"), which they retrieve from the WWW. These documents are retrieved by a web crawler or spider, which is an automated web browser which follows the links it encounters in a crawled document. The contents of each successfully crawled document are indexed, thereby adding data concerning the words or terms in the document to an index database for use in responding to queries. Some search engines, also store all or part of the document itself, in addition to the index entries. When a user makes a search query having one or more terms, the search engine searches the index for documents that satisfy the query, and provides a listing of matching documents, typically including for each listed document the URL, the title of the document, and in some search engines a portion of document's text deemed relevant to the query.

It can be useful for various purposes to rank or assign importance values to nodes in a large linked database. For example, the relevance of database search results can be improved by sorting the retrieved nodes according to their ranks, and presenting the most important, highly ranked nodes first. Alternately, the search results can be sorted based on a query score for each document in the search results, where the query score is a function of the document ranks as well as other factors.

One approach to ranking documents involves examining the intrinsic content of each document or the back-link anchor text in parents of each document. This approach can be computationally intensive and often fails to assign highest ranks to the most important documents. Another approach to ranking involves examining the extrinsic relationships between documents, i.e., from the link structure of the directed graph. This type of approach is called a link-based ranking. For example, U.S. Pat. No. 6,285,999 to Page discloses a technique used by the Google search engine for assigning a rank to each document in a hypertext database. According to the link-based ranking method of Page, the rank of a node is recursively defined as a function of the ranks of its parent nodes. Looked at another way, the rank of a node is the steady-state probability that an arbitrarily long random walk through the network will end up at the given node. Thus, a node will tend to have a high rank if it has many parents, or if its parents have high rank.

Although link-based ranking techniques are improvements over prior techniques, in the case of an extremely large database, such as the world wide web which contains billions of pages, the computation of the ranks for all the pages can take considerable time. Accordingly, it would be valuable to provide techniques for calculating page ranks with greater computational efficiency.

SUMMARY

In one embodiment, the invention includes iteratively solving a ranking function for a set of document rank values with respect to a set of linked documents until a first stability condition is satisfied. The ranking function is modified so as to reduce the ranking function's computation cost and then the modified ranking function is solved until a second stability condition is satisfied.

BRIEF DESCRIPTION OF THE DRAWINGS

The aforementioned features and advantages of the invention as well as additional features and advantages thereof will be more clearly understood hereinafter as a result of a detailed description of embodiments of the invention when taken in conjunction with the drawings. Like reference numerals refer to corresponding parts throughout the several views of the drawings.

DESCRIPTION OF EMBODIMENTS

Figure 1:
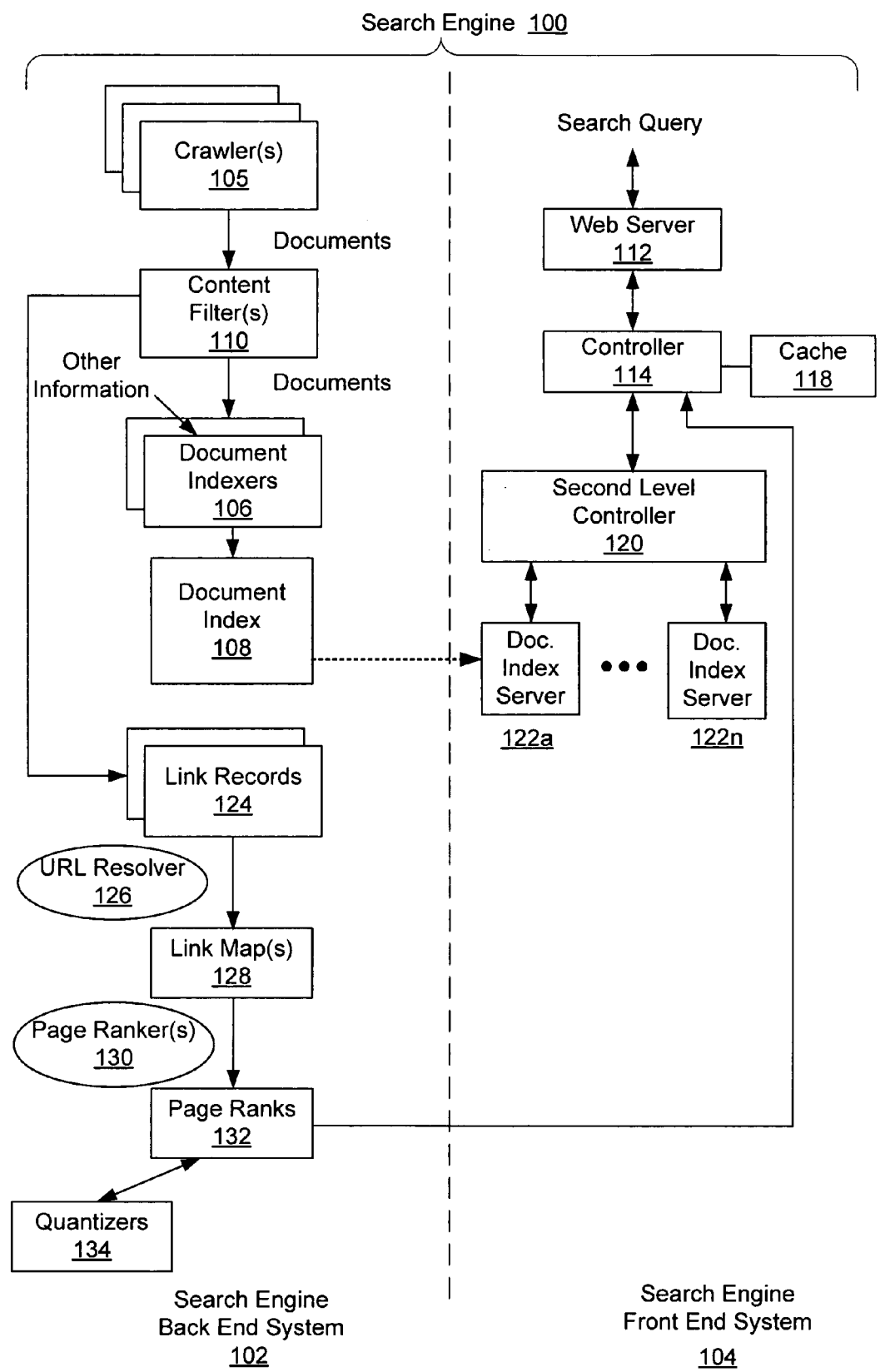
FIG. 1 illustrates a search engine environment in accordance with an embodiment of the present invention.

The techniques of the present invention may used in a search engine environment where the linked database is generated from crawling a number of documents, such as the Internet. FIG. 1 is a block diagram of one such typical search engine environment. As illustrated in FIG. 1, a search engine 100 has a back end system 102 and a front end system 104. The layout of the search engine system 100 is merely exemplary and can take on any other suitable layout or configuration.

The back end system 102 may include one or more crawlers 105 (also known as spiders), one or more document indexers 106 and a document index 108. To index the large number of Web pages that exist on the worldwide web, the web crawler 104 locates and downloads web pages and other information (hereinafter also referred to as "documents"). In some embodiments, a set of content filters 110 identify and filter out duplicate documents, and determine which documents should be sent to the document indexers 106 for indexing. The document indexers 106 process the downloaded documents, creating a document index 108 of terms found in those documents. If a document changes, then the document index 108 is updated with new information. Until a document is indexed, it is generally not available to users of the search engine 100.

The front end system 104 may include a web server 112, one or more controllers 114, a cache 118, a second level controller 120 and one or more document index servers 122a, . . . , 122n. The document index 108 is created by the search engine 100 and is used to identify documents that contain one or more terms in a search query. To search for documents on a particular subject, a user enters or otherwise specifies a search query, which includes one or more terms and operators (e.g., Boolean operators, positional operators, parentheses, etc.), and submits the search query to the search engine 100 using the web server 112.

The controller 114 is coupled to the web server 112 and the cache 118. The cache 118 is used to speed up searches by temporarily storing previously located search results. In some embodiments, the cache 118 is distributed over multiple cache servers. Furthermore, in some embodiments, the data (search results) in the cache 118 is replicated in a parallel set of cache servers.

While the following discussion describes certain functions as being performed by one or more second level controllers 120, it should be understood that the number of controllers (114, 120) and the distribution of functions among those controllers may vary from one implementation to another. The second level controller 120 communicates with one or more document index servers 122a, . . . , 122n. The document index servers 122a, . . . , 122n (or alternately, one of the controllers 114, 120) encode the search query into an expression that is used to search the document index 108 to identify documents that contain the terms specified by the search query. In some embodiments, the document index servers 122 search respective partitions of the document index 108 generated by the back end system 102 and return their results to the second level controller 120. The second level controller 120 combines the search results received from the document index servers 122a, . . . , 122n, removes duplicate results (if any), and forwards those results to the controller 114. In some embodiments, there are multiple second level controllers 120 that operate in parallel to search different partitions of the document index 108, each second level controller 120 having a respective set of document index servers 122 to search respective sub-partitions of document index 108. In such embodiments, the controller 114 distributes the search query to the multiple second level controllers 120 and combines search results received from the second level controllers 120. The controller 114 also stores the search query and search results in the cache 118, and passes the search results to the web server 112. A list of documents that satisfy the search query is presented to the user via the web server 112.

In some embodiments, the content filters 110, or an associated set of servers or processes, identify all the links in every web page produced by the crawlers 105 and store information about those links in a set of link records 124. The link records 124 indicate both the source URL and the target URL of each link, and may optionally contain other information as well, such as the "anchor text" associated with the link. A URL Resolver 126 reads the link records 124 and generates a database 128 of links, also called link maps, which include pairs of URLs or other web page document identifiers. In some embodiments, the links database 128 is used by a set of one or more Page Rankers 130 to compute Page Ranks 132 for all the documents downloaded by the crawlers. These Page Ranks 132 are then used by the controller 114 to rank the documents returned in response to a query of the document index 108 by document index servers 122. Alternately, the document index servers 122 may utilize the Page Ranks 132 when computing query scores for documents listed in the search results. In certain embodiments of the present invention, the back end system 102 further comprises quantizers 134 that are used to quantize data in Page Ranks 132. Brin and Page, "The Anatomy of a Large-Scale Hypertextual Search Engine," 7th International World Wide Web Conference, Brisbane, Australia, provides more details on how one type of Page Rank metric can be computed. Other types of link-based on non-link based ranking techniques could also be utilized.

A link-based ranking system, such as PageRank, makes the assumption that a link from a page u to a page v can be viewed as evidence that page v is an "important" page. In particular, the amount of importance conferred on page v by page u is proportional to the importance of page u and inversely proportional to the number of pages to which page u points. Since the importance of page u is itself not known, determining the importance for every page i requires an iterative fixed-point computation.

In one embodiment, the importance of a page i is defined as the probability that at some particular time step, a random web surfer is at page i. Provided that the surfer chooses one of the links on page i, that link is chosen with a probability of 1 divided by the number of outlinks from page i, when the probability of choosing any of the outlinks is uniform across the outlinks. A transition probability matrix, P, may be created where $P(i,j)$ is provided as $1/\deg(i)$, where $\deg(i)$ represents the number of outlinks from page i. In other embodiments, $P(i,j)$ could take into consideration certain personalization information for an individual or for a group, or could take into account other information derived from page i itself and/or elsewhere, and need not be uniform over each outlink from a given page.

Some web pages have no outlinks, but for P to be a more useful transition probability matrix, every node must have at least 1 outgoing transition, i.e., P should have no rows consisting of all zeros. A matrix P can be converted into a more useful transition matrix by adding a complete set of outgoing transitions to pages with outdegree(0), i.e., no outlinks, to account for the probability that the surfer visiting that page randomly jumps to another page. In one embodiment, the row for a page having no outlinks is modified to account for a probability that the surfer will jump to a different page uniformly across all pages, i.e., each element in the row becomes $1/n$, where n is the number of nodes, or pages. In another embodiment, the modification could be non-uniform across all nodes and take into account personalization information. This personalization information might cause certain pages to have a higher probability compared to others based on a surfer's preferences, surfing habits, or other information. For example, if a surfer frequently visits http://www.google.com, the transition probability from page i to the Google homepage would be higher than a page that the user infrequently visits. Another modification to P may take into account the probability that any random surfer will jump to a random Web page (rather than following an outlink). The destination of the random jump is chosen according to certain probability distributions. In some embodiments, this is uniform across all pages and in some embodiments this distribution is non-uniform and based on certain personalization information. Taking the transpose of the twice modified matrix P provides a matrix A. In the matrix P, a row i provided the transition probability distribution for a surfer at node i, whereas in the matrix A this is provided by column i. Mathematically this can be represented as:

$$A = (c(P+D)+(1-c)E)^T,$$

where P is a probability transition where P(i,j) represents the probability that the surfer will choose one of the links on i to page j; D represents the probability that a surfer visiting a page with no outlinks will jump to any other page; E represents the probability that a surfer will not choose any of the links and will jump to another page; and (1−c) represents a de-coupling factor indicating how likely it is that a surfer will jump to a random Web page, while c represents a coupling factor indicating how likely it is that a surfer will select one of the links in a currently selected or viewed page.

Assuming that the probability distribution over all the nodes of the surfer's location at time 0 is given by $x^{(0)}$, then the probability distribution for the surfer's location at time k is given by $x^{(k)} = A^{(k)} x^{(0)}$. The unique stationary distribution of the Markov chain is defined as $\lim_{k \to \infty} x^{(k)}$, which is equivalent to $\lim_{k \to \infty} A^{(k)} x^{(0)}$, and is independent of the initial distribution $x^{(0)}$. This is simply the principal eigenvector of the matrix A and the values can be used as ranking values. One way to calculate the principal eigenvector begins with a uniform distribution $x^{(0)} = v$ and computes successive iterations of the ranking function, $x^{(k)} = A x^{(k-1)}$, until convergence. Convergence can be defined when two successive iterations of the ranking function produce a difference within a tolerance value. Various method can be used to determine tolerance values based on desired convergence characteristics or how much variation exists as the tolerance decreases.

Figure 2:
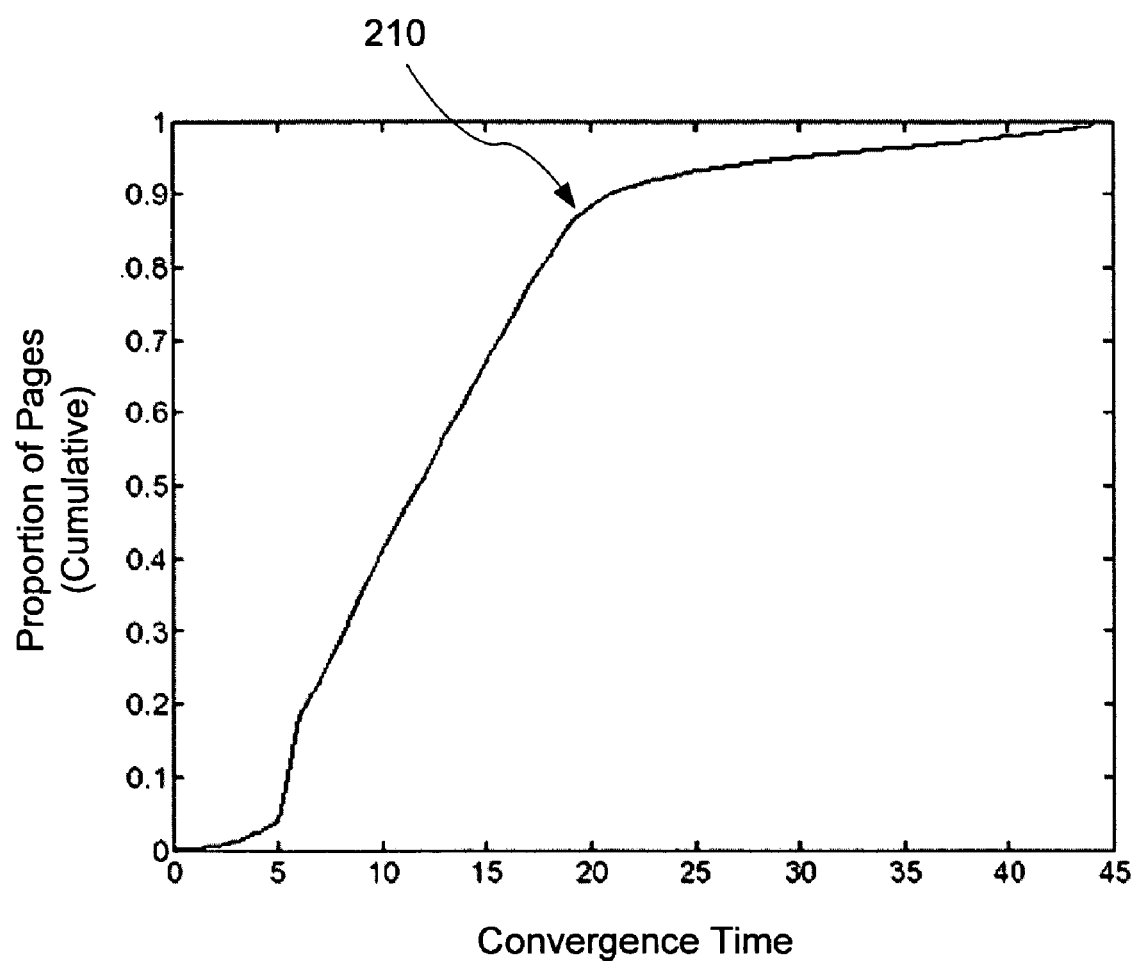
FIG. 2 illustrates a graph of the cumulative proportion of converged pages versus convergence time in accordance with an embodiment of the invention.

FIG. 2 illustrates an exemplary cumulate plot of convergence times using the above described iterative process. The x-axis represents convergence by iteration number and the y-axis represents the cumulative proportion of document rank values that have converged. At a point 210, it can be seen, for this exemplary data set, that a large number of ranks have converged by point 210 within 20 iterations, but the final ranks take a significantly longer time to converge.

Embodiments of the invention take advantage of this skewed distribution of convergence times to reduce the computational cost required for the determination of the full set of document rank values. Computational cost can be reduced by reducing the number of operations that must be performed and/or simplifying the types that must be preformed. Additionally, reducing the need to move items in and out of main memory can have an effect on computational cost. By not recalculating the ranks of those ranks which have converged during a particular cycle of iterations, embodiments of the invention reduce the computation cost of determining document rank values.

Figure 3:
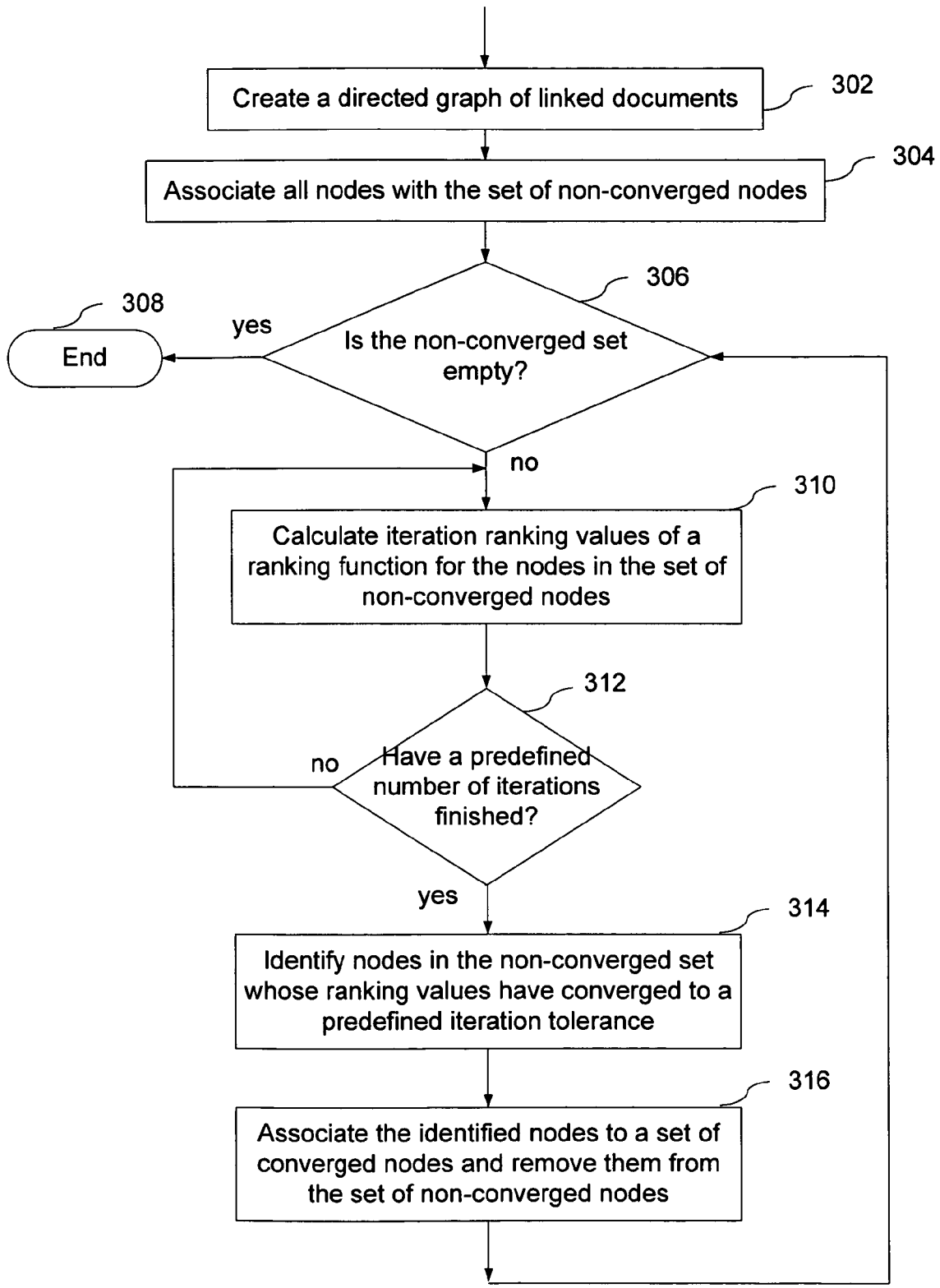
FIG. 3 illustrates solving the ranking function in accordance with an embodiment of the invention

Referring to FIG. 3, a directed graph of linked documents is initially created (302) where each document is represented by a node in the graph, and all nodes are associated with the set of nodes whose document rank values have not converged (304). If the set of nodes which have not converged is empty (306-yes), then all the nodes have converged and the process ends (308). If the set of nodes which have not converged is not empty (330-no), then an iteration of the function is calculated for those nodes which have not converged (310). A predetermined number of iterations are completed per given cycle before examining which nodes' document rank values have converged. Accordingly, if a predetermined number of iterations for the current cycle has not been completed (312-no), then an additional iteration is calculated (310). On the other hand, if the predetermined number of iterations for the cycle been completed (312-yes), then those nodes whose ranks have converged are identified (314). The number of iterations per cycle can be chosen in different ways and in some embodiments may depend on the balancing the computation cost of identifying the nodes which have converged and modifying the ranking function versus computing the iterations. For example, the number of iterations could be chosen from a number between 5 and 15. In other embodiments, the number of iterations prior to identifying converged ranks could vary depending on a given cycle, with successive cycles having different number of iterations. For example, when the number of iterations for a cycle has been met (312-yes), the number of iterations for the next loop could be modified, such that the next iterative cycle would end after a different set of iterations, and so on. In other embodiments, instead of basing the end of a cycle on whether a number of iterations have been completed, the cycle is based on a proportion of nodes whose rank has converged. For example, the first cycle of iterations could complete after 25% of the nodes have converged. The proportion for the next cycle could be set to be an additional 25% or some other percentage. One of ordinary skill in the art will readily recognize other ways this concept can be expanded using various criteria to end the iterative cycle.

After the iteration cycle is complete (312-yes), those nodes whose document ranking value has converged to within a predefined iteration tolerance are identified (314). In some embodiments, the same tolerance value is used for each cycle of iteration and in other embodiments, the tolerance value could vary depending on the iterative cycle. Tolerances values could be selected from 0.00001 to 0.01, or other values. Those nodes which have converged are disassociated with the set of non-converged nodes (316). The process continues until all document rank values have converged or some other type of ending mechanism is triggered. Other triggering mechanisms might include, for example, identifying convergence for a specific subset of nodes.

In other embodiments, a first phase of rank computation may be computed using an initial tolerance level for convergence as described above and using the phase tolerance level for each cycle of iteration in the phase. However, another phase of rank computation could follow using a second tolerance level for the cycles in the phase and using the ranks previously computed in the first phase as respective, initial document rank values in the next phase of rank computation. In some embodiments, the second tolerance level is smaller by an order of magnitude than the previous phase. In some embodiments, more than two phases are used with successively narrower tolerances for convergence.

Figure 4:
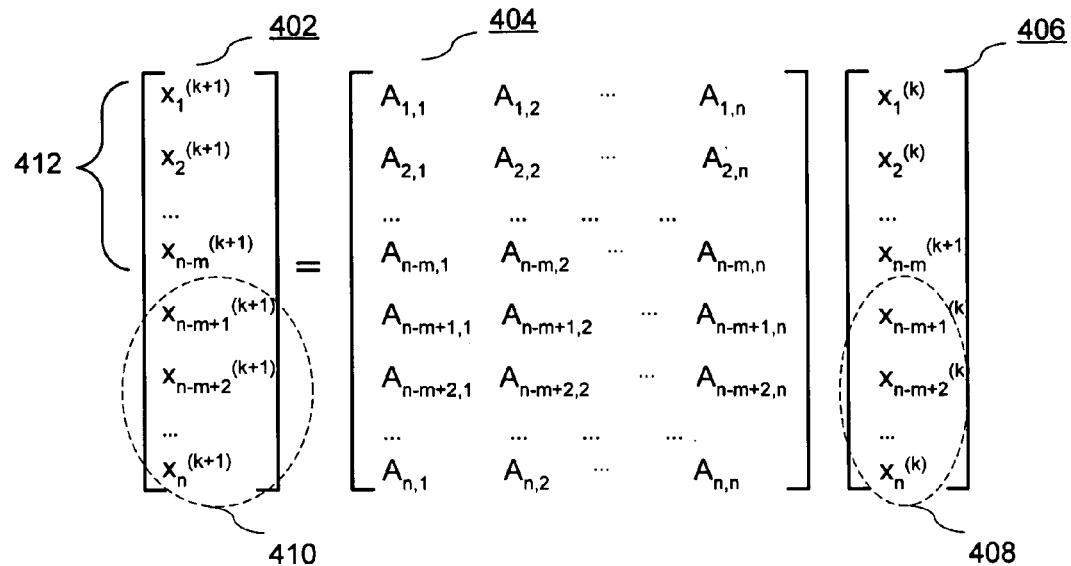
FIG. 4 illustrates a ranking function in accordance with an embodiment of the invention.

When the nodes whose document rank values are associated with the converged set, their document rank values are no longer calculated. In some embodiments, computing only document rank values which have not converged takes advantage of the matrix structure of the ranking function. As mentioned above, in some embodiments, the ranking function can be described as $x^{(k)} = A x^{(k-1)}$. At some time k, some of the document rank values will have converged. FIG. 4 illustrates a ranking function accordance with some embodiments where some of the rank values have converged. Column 402 of FIG. 4 illustrates the document rank value at the k+1$^{st}$ iteration of the ranking function for node, or document, i, $x_i^{(k+1)}$. The document ranking values for the k+1$^{st}$ iteration are given by the matrix multiplication of A (shown at 404) by the k$^{th}$ iteration of the document rank values $x_i^{(k)}$ (shown at 406). The ranks which have converged by iteration k can be represented by $x_{n-m+1}^{(k)}$ to $x_n^{(k)}$ (shown at 408), where n represents the total number of nodes, or documents, and m represents the number of document rank values which have converged. Accordingly, the values for $x^{n-m+1(k+1)}$ to $x_n^{(k+1)}$ (shown at 410) at the k+1$^{st}$ iteration will be the same as $x_{n-m+1}^{(k)}$ to $x_n^{(k)}$ (shown at 408) and those document rank values need not be calculated again. In some embodiments, only the calculations for those nodes which have not converged (shown at 412) are calculated. The ranking function is modified to remove those rows from the calculation. In some embodiments, the rows of column 402 and matrix 404 corresponding to the converged nodes 410 are not read into memory. In some embodiments, the matrix multiplication needed for rows corresponding to the converged ranks are simply ignored and not calculated. In other embodiments the rows of 402 and 404 corresponding to the converged ranks are replaced by all zeros (which significantly reduces computation time). In these embodiments, the column 406 is not affected since the converged values therein are used in the ranking function iteration. In some embodiments, the rows are initially ordered by decreasing order of convergence based on a previous solving of the ranking function. This has the effect of keeping longer converging nodes in main memory and reducing the amount of memory accesses to read portions of the modified ranking function into memory during the course of the computation. As mentioned earlier, reducing the amount of memory accesses can significantly reduce computation cost.

Figure 5:
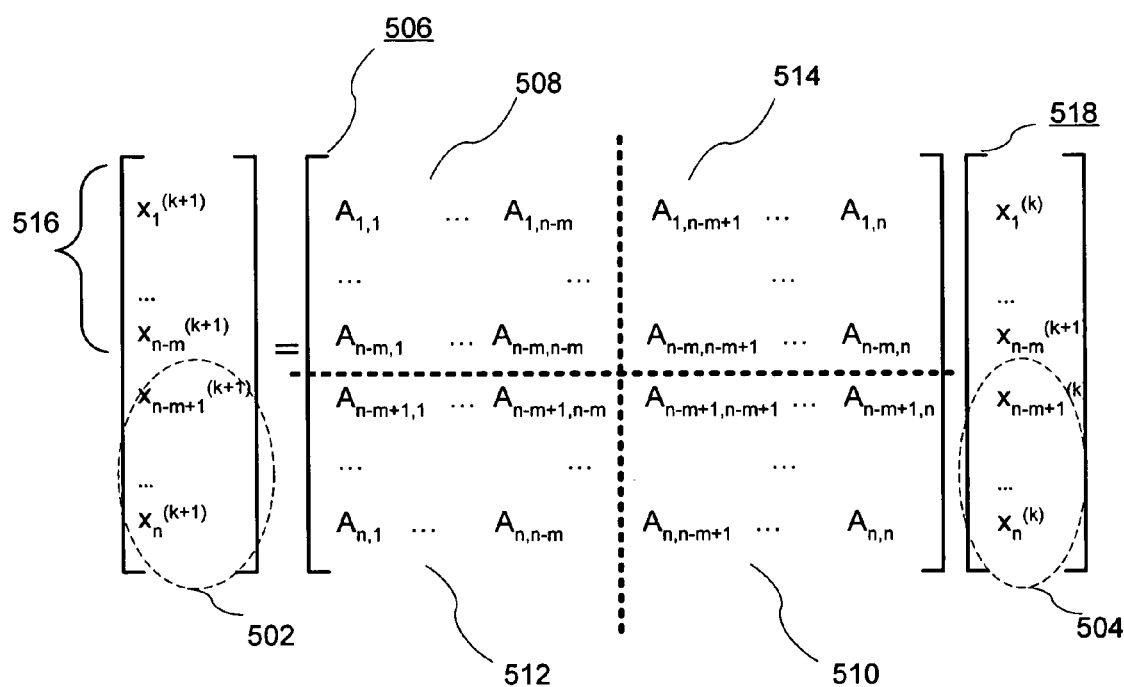
FIG. 5 illustrates a ranking function in accordance with an embodiment of the invention.

During each cycle of iteration, the contributions to the rank of a non-converged node from the converged nodes is a constant. Accordingly, in some embodiments these contributions are only calculated once per cycle of iteration. These embodiments can be understood with reference to FIG. 5. After a period of iterations, the nodes 502 have converged as described above. Accordingly, the values at 504 will remain constant throughout each iteration cycle until another examination of convergence is made (314 and 316 of FIG. 3). The matrix 506 now may be thought of as consisting of 4 partitions 508, 510, 512, 514. The partition 508 illustrates the contributions that the non-converged nodes make to other non-converged nodes 516 (also called sub-matrix 516). The partition 510 illustrates the contributions that converged nodes make to converged nodes. The partition 512 illustrates the contributions that the non-converged nodes make to the converged nodes. Finally, the partition 514 illustrates the contributions that the converged nodes make to the non-converged nodes 516. When matrix 518 (the previous document ranks values) is multiplied against a row i in matrix 506, the multiplication products corresponding to values in partition 514 are constants. Therefore, to modify the ranking function even further, some embodiments only calculate the products produced by multiplying partition 514 (representing contributions of the converged nodes to the non-converged nodes) once per iteration cycle. The sum of those products is a constant for each row of partitions 508 and 514. This constant for each row is used each time a new iteration is computed. If partition 508 is represented as $A_{NN}$; partition 514 is represented as $A_{CN}$; the non-converged nodes sub-matrix 516 is represented by $x_N^{(k+1)}$ and the converged nodes sub-matrix 504 is represented by $x_C^{(k)}$, then the modified ranking function is represented as $x_N^{(k+1)} = A_{NN} x_N^{(k)} + A_{CN} x_C^{(k)}$. The last term in the modified ranking function, $A_{CN} x_C^{(k)}$, produces a matrix of constants that may be computed once and then reused during subsequent computational iterations.

Although some of the drawings illustrate a number of logical stages in a particular order, stages which are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

Figure 6:
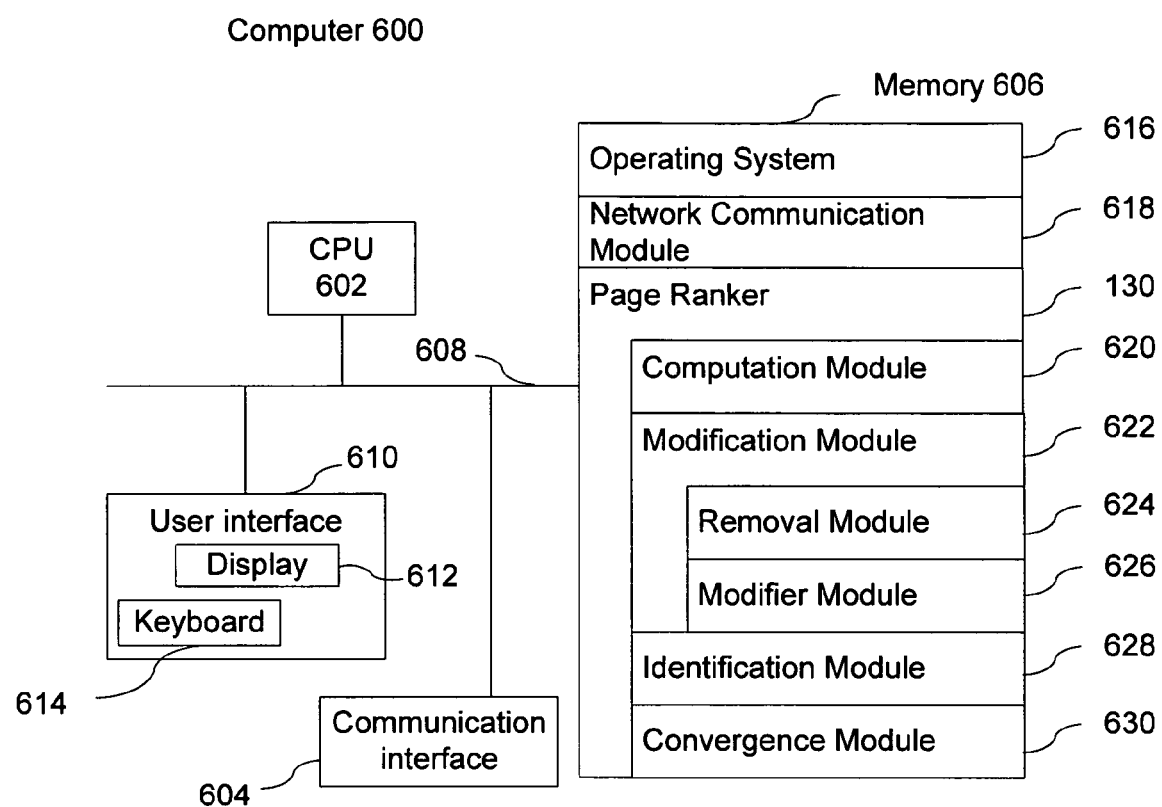
FIG. 6 illustrates a computer system in accordance with an embodiment of the invention.

Referring to FIG. 6, an embodiment of a computer 600 that implements the methods described above includes one or more processing units (CPU's) 602, one or more network or other communications interfaces 604, memory 606, and one or more communication buses 608 for interconnecting these components. The computer 600 may optionally include a user interface 610 comprising a display device 612 (e.g., for displaying system status information) and/or a keyboard 614 (e.g., for entering commands). Memory 606 may include high speed random access memory and may also include non-volatile memory, such as one or more magnetic or optical storage disks. Memory 606 may include mass storage that is remotely located from CPU's 602. The memory 606 may store:

- an operating system 616 that include procedures for handling various basic system services and for performing hardware dependent tasks;
- a network communication module (or instructions) 618 that is used for connecting the computer 600 to other computers via the one or more communications network interfaces 604 (wired or wireless), such as the Internet, other wide area networks, local area networks, metropolitan area networks, and so on;
- a page ranker 130 for computing page ranks as described above and includes:
  - a computation module 620 for computing iterations of a ranking function as described above;
  - a modification module 622 that modifies the ranking function to reduce the ranking function's computation cost as described above including a removal module 624 for removing rows from the ranking functions as described above and/or a modifier module 626 for modifying the ranking function based on the identified converged nodes as described above;
  - an identification module 628 for identifying those nodes that have converged; and
  - a convergence module 630 for determining when a nodes has converged.

Each of the above identified modules corresponds to a set of instructions for performing a function described above. These modules (i.e., sets of instructions) need not be implemented as separate software programs, procedures or modules, and thus various subsets of these modules may be combined or otherwise re-arranged in various embodiments.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method for determining document rank values, comprising:
   iteratively solving a ranking function for a set of document rank values with respect to a set of linked documents until a first stability condition is satisfied;
   modifying the ranking function so as to reduce the ranking function's computation cost;
   solving the modified ranking function until a second stability condition is satisfied so as to produce a solution of the modified ranking function; and
   assigning respective ranks to at least a subset of the documents in the set of linked documents in accordance with the solution of the modified ranking function.

2. The method of claim 1, wherein the modifying includes identifying a subset of the document rank values that have converged to within a tolerance.

3. The method of claim 2, wherein the modifying includes removing a portion of the ranking function corresponding to the identified subset of the document rank values.

4. The method of claim 3, wherein the modifying includes modifying a portion of the ranking function corresponding to the identified subset of the document rank values.

5. The method of claim 1, wherein the first stability condition is satisfied after completing a first number of iterations of the ranking function.

6. The method of claim 1, wherein the second stability condition is satisfied after completing a second number of iterations of solving the modified ranking function.

7. The method of claim 1, wherein the first stability condition is satisfied after completing a first number of iterations of solving the ranking function, and wherein the first and second numbers of iterations are different.

8. The method of claim 1, wherein the first stability condition is satisfied when a percentage of the linked documents have a current rank which has converged to within a tolerance.

9. The method of claim 1, further including:
   providing a matrix A where A(j,i) represents a directed link value from a document to a document j; and
   wherein the ranking function includes the matrix and the modifying includes removing from the matrix those rows corresponding to documents whose respective current document rank value has converged to within a tolerance.

10. The method of claim 1, further including:
    providing a matrix A where A(j,i) represents a directed link value from a document i to a document j; and
    wherein the ranking function includes the matrix and the modifying includes removing from the matrix those columns corresponding to documents whose current document rank value has converged to within a tolerance.

11. The method of claim 1, further including:
    providing a matrix A where A(j,i) represents a directed link value from a document i to a document j; and
    wherein the ranking function includes the matrix and the modifying includes removing from the matrix those columns and rows corresponding to documents whose respective current document rank value has converged to within a tolerance.

12. A computer program product, for use with a computer system, the computer program product comprising:
    instructions for iteratively solving a ranking function for a set of document rank values with respect to a set of linked documents until a first stability condition is satisfied;
    instructions for modifying the ranking function so as to reduce the ranking functions computation cost;
    instructions for solving the modified ranking function until a second stability condition is satisfied so as to produce a solution of the modified ranking function; and
    instructions for assigning respective ranks to at least a subset of the documents in the set of linked documents in accordance with the solution of the modified ranking function.

13. The computer program product of claim 12, wherein the instructions for modifying include identifying a subset of the document rank values that have converged to within a tolerance.

14. The computer program product of claim 13, wherein the instructions for modifying include instructions for removing a portion of the ranking function corresponding to the identified subset of the document rank values.

15. The computer program product of claim 13, wherein the instructions for modifying include instructions for modifying a portion of the ranking function corresponding to the identified subset of the document rank values.

16. The computer program product of claim 12, further including instructions for satisfying the first stability condition after completion of a first number of iterations of the ranking function.

17. The computer program product of claim 12, further including instructions for satisfying the second stability condition after completion of a second number of iterations of solving the modified ranking function.

18. The computer program product of claim 17, further including instructions for satisfying the first stability condition after completion of a first number of iterations of solving the ranking function, and wherein the first and second numbers of iterations are different.

19. The computer program product of claim 12, further including instructions for satisfying the first stability condition when a percentage of the linked documents have a current rank which has converged to within a tolerance.

20. The computer program product of claim 12, further including:
    instructions for providing a matrix A where A(j,i) represents a directed link value from a document i to a document j; and
    wherein the ranking function includes the matrix and the instructions for modifying includes instructions for removing from the matrix those rows corresponding to documents whose respective current document rank value has converged to within a tolerance.

21. The computer program product of claim 12, further including:
    instructions for providing a matrix A where A(j,i) represents a directed link value from a document i to a document j; and
    wherein the ranking function includes the matrix and the instructions for modifying includes instructions for removing from the matrix those columns corresponding to documents whose current document rank value has converged to within a tolerance.

22. The computer program product of claim 12, further including:
    instructions for providing a matrix A where A(j,i) represents a directed link value from a document i to a document j; and
    wherein the ranking function includes the matrix and the instructions for modifying includes instructions for removing from the matrix those columns and rows corresponding to documents whose respective current document rank value has converged to within a tolerance.

23. A system for determining document rank values, comprising:
   a computation module that iteratively solves a ranking function for a set of document rank values with respect to a set of linked documents;
   a modification module that modifies the ranking function so as to reduce the ranking function's computation cost; and
   a control module that is configured to use the computation module to solve the ranking function until a first stability condition is satisfied, use the modification module to modify the ranking function, and use the computation module to solve the modified ranking function until a second stability condition is satisfied so as to produce a solution of the modified ranking function and assign respective ranks to at least a subset of the documents in the set of linked documents in accordance with the solution of the modified ranking function.

24. The system of claim 23, further including an identification module that identifies a subset of the document rank values that have converged to within a tolerance.

25. The system of claim 24, wherein the modification module includes removal instructions that remove a portion of the ranking function corresponding to the identified subset of the document rank values generated from the identification module.

26. The system of claim 24, wherein the modification module includes a modifier instructions that modify a portion of the ranking function corresponding to the identified subset of the document rank values generated from the identification module.

27. The system of claim 23, further including first convergence instructions corresponding to the first stability condition, the first convergence instructions identifying when a first number of iterations of solving the ranking function are completed.

28. The system of claim 27, further including second convergence instructions corresponding to the second stability condition, the second convergence identifying when the second stability condition is satisfied.

29. The system of claim 28, wherein the second stability condition corresponds to a second number of iterations of solving the ranking function, and wherein the first and second numbers of iterations are different.

30. The system of claim 23, further including a convergence percentage and a convergence module that identifies the first stability condition when a percentage of the linked documents equal to the convergence percentage have a current rank which has converged to within a tolerance.

31. A system for determining document rank values, comprising:
   means for iteratively solving a ranking function for a set of document rank values with respect to a set of linked documents until a first stability condition is satisfied;
   means for modifying the ranking function so as to reduce the ranking function's computation cost; and
   means for solving the modified ranking function until a second stability condition is satisfied;
   wherein operation of the system produces a solution of the modified ranking function and assigns respective ranks to at least a subset of the documents in the set of linked documents in accordance with the solution of the modified ranking function.

* * * * *